No. 859,832. PATENTED JULY 9, 1907.
F. W. NORDSTROM.
LEVELING INSTRUMENT.
APPLICATION FILED APR. 11, 1907.

Witnesses
Frank Hough

Inventor
Frank W. Nordstrom,
By Victor J. Evans
Attorney

UNITED STATES PATENT OFFICE.

FRANK W. NORDSTROM, OF KEARSARGE, MICHIGAN.

LEVELING INSTRUMENT.

No. 859,832.  Specification of Letters Patent.  Patented July 9, 1907.

Application filed April 11, 1907. Serial No. 367,550.

*To all whom it may concern:*

Be it known that I, FRANK W. NORDSTROM, a citizen of the United States of America, residing at Kearsarge, in the county of Houghton and State of Michigan, have invented new and useful Improvements in the Leveling Instruments, of which the following is a specification.

This invention relates to leveling instruments, and one of the principal objects of the same is to provide means for detachably connecting the plumb line to the under side of the tripod top.

Another object of the invention is to provide a magnetic connection between the plumb line and the underside of the tripod support by means of which the plumb line may be detached from the table and always insured a central position when attached.

Figure 1:
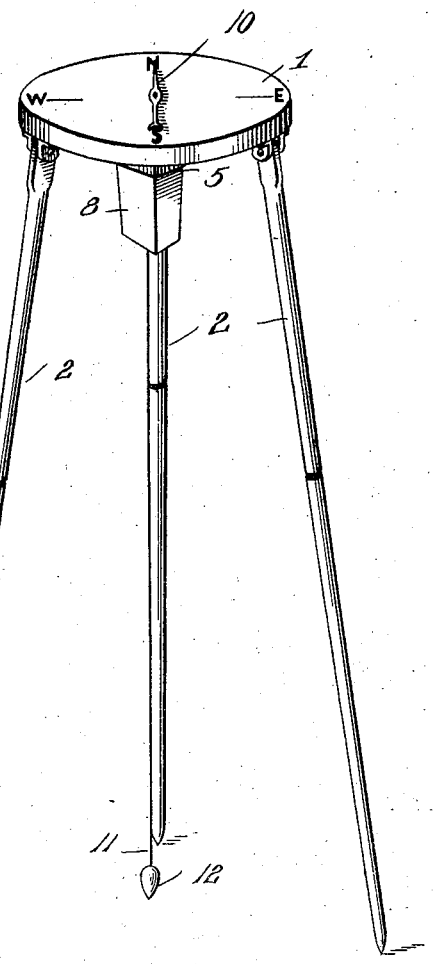
Figure 2:
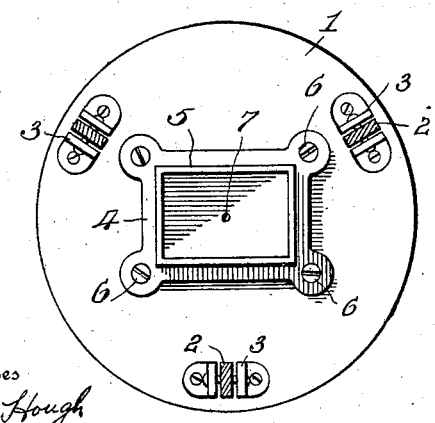
Figure 3:
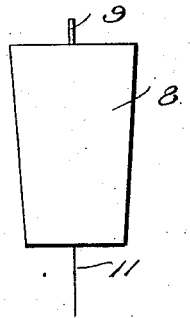

These objects are attained by means of the construction illustrated in the accompanying drawing, in which:

Figure 1 is a perspective view of a tripod for a leveling instrument, and showing a plumb line attached under the top of the table or tripod by means of a magnet. Fig. 2 is an underside plan view of the tripod top, the pivotal connection of the legs being shown in section. Fig. 3 is a side elevation of the magnet for supporting the plumb line.

Referring to the drawing for a more particular description of my invention, the numeral 1 designates the top of the tripod, and 2 are the legs connected underneath the top 1 by means of pivots 3 in the usual manner. Secured centrally underneath the top 1 is a socket frame 4 of hard steel provided with a rectangular downwardly extending flange 5, said frame being secured to the underside of the table top by means of screws 6. Formed centrally in the socket frame is an aperture 7, said aperture extending through the top 1. A magnetized metal support 8 is provided with a central pin 9 which extends through the aperture 7 and mounted upon its upper end above the table top is a magnetic needle 10. Secured to the underside of the support 8 is a plumb line 11, to the lower end of which is attached a plumb bob 12, the line 11 being connected directly in the center of said magnetic support. The support 8 is fitted within the rectangular flange 5 with the pin 9 extending through the aperture 7. By this means the magnetic support is centered within the socket and the magnetic action between the support 8 and the socket frame 4 holds the plumb line in a central position, and permits the same to be detached by withdrawing the support 8 from the socket.

From the foregoing it will be seen that by means of my invention whenever it is required to attach the plumb line it cannot be out of true because the pin 9 always occupies a central position and the support is held within a flange which does not permit displacement. Moreover, the plumb line is readily detachable by severing the support 8 from the socket and the connection is made without screw threading.

Having thus described the invention, what I claim is:

1. In a leveling instrument, a tripod top having a central aperture, a metal frame secured under said top, said frame provided with a central aperture registering with the aperture in said top, and a rectangular flange forming a socket, and a magnetic support shaped to fit the socket having a plumb line secured to the underside thereof and a pin projecting from the upper side thereof, said pin extending through the aperture in the socket frame and through the top of the tripod, and a magnetic needle mounted upon said pin, substantially as described.

2. In a leveling instrument, a tripod, a metal socket under said tripod, said socket provided with a central aperture, a plumb line support of magnetic material fitting in the socket and having a pin in its upper end passed through the aperture in the socket, and a needle mounted upon the upper end of said pin.

3. In a leveling instrument, a metal socket frame mounted thereon, and a magnetic body carrying a plumb line and fitting the socket.

In testimony whereof, I affix my signature in presence of two witnesses.

FRANK W. NORDSTROM.

Witnesses:
NILS O. NORDSTROM,
CHARLES JACKSON.